UNITED STATES PATENT OFFICE.

HENRY G. MORRIS AND PEDRO G. SALOM, OF PHILADELPHIA, PENNSYLVANIA.

MOTOR-PROPELLED VEHICLE.

SPECIFICATION forming part of Letters Patent No. 579,890, dated March 30, 1897.

Application filed June 20, 1896. Serial No. 596,343. (No model.)

*To all whom it may concern:*

Be it known that we, HENRY G. MORRIS and PEDRO G. SALOM, citizens of the United States, and residents of Philadelphia, Pennsylvania, have invented certain Improvements in Motor-Propelled Vehicles, of which the following is a specification.

Our invention relates to certain improvements in vehicles driven by electricity; and the object of our present invention is to provide suitable steering-gear which will act quickly and to so mount the motors that the two driving-wheels will be driven independently of each other, so that the vehicle can readily turn curves, dispensing with the ordinary cumbersome gearing usually employed for enabling one driving-wheel to travel faster than the other.

Figure 1:
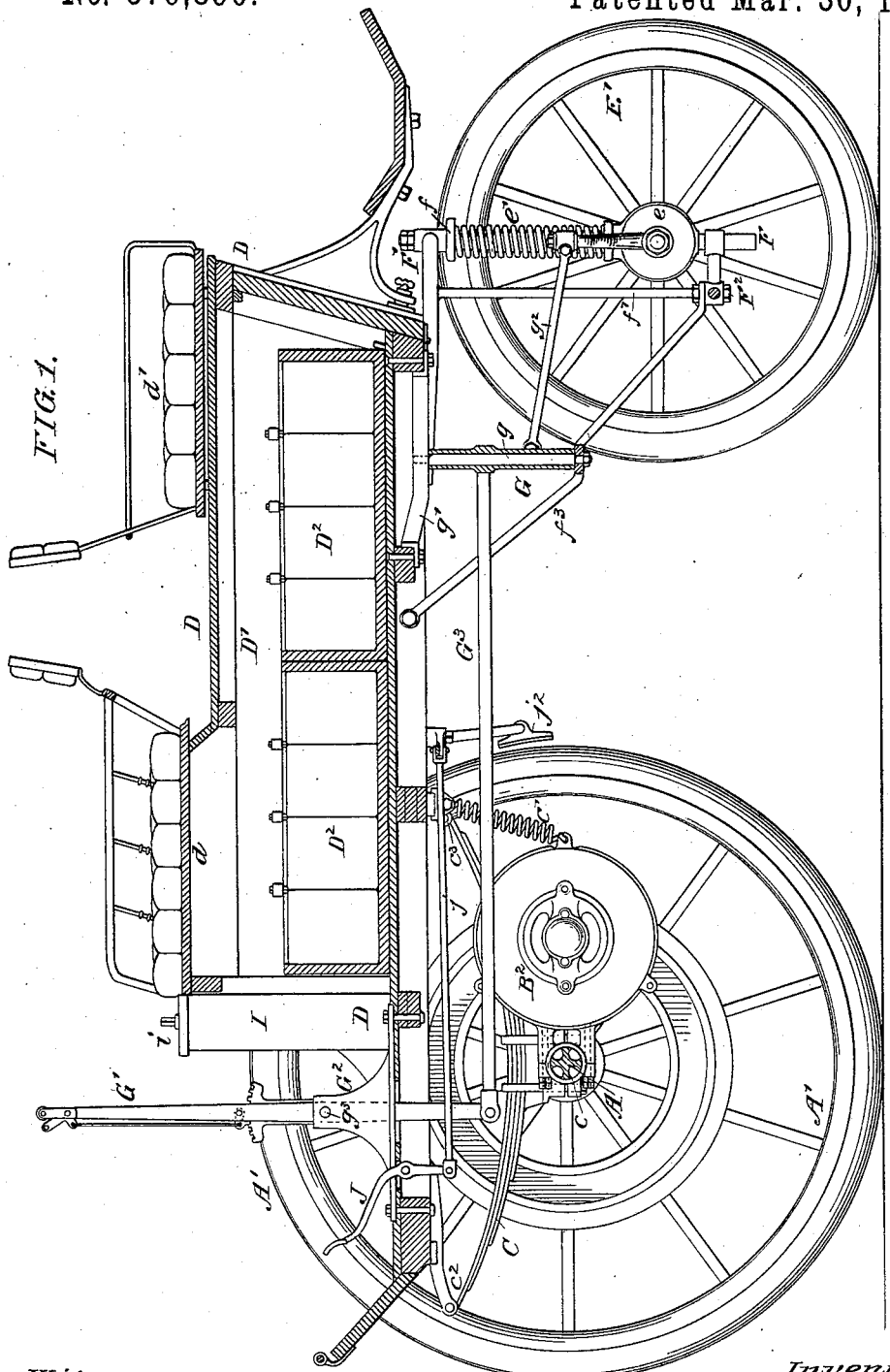
Figure 2:
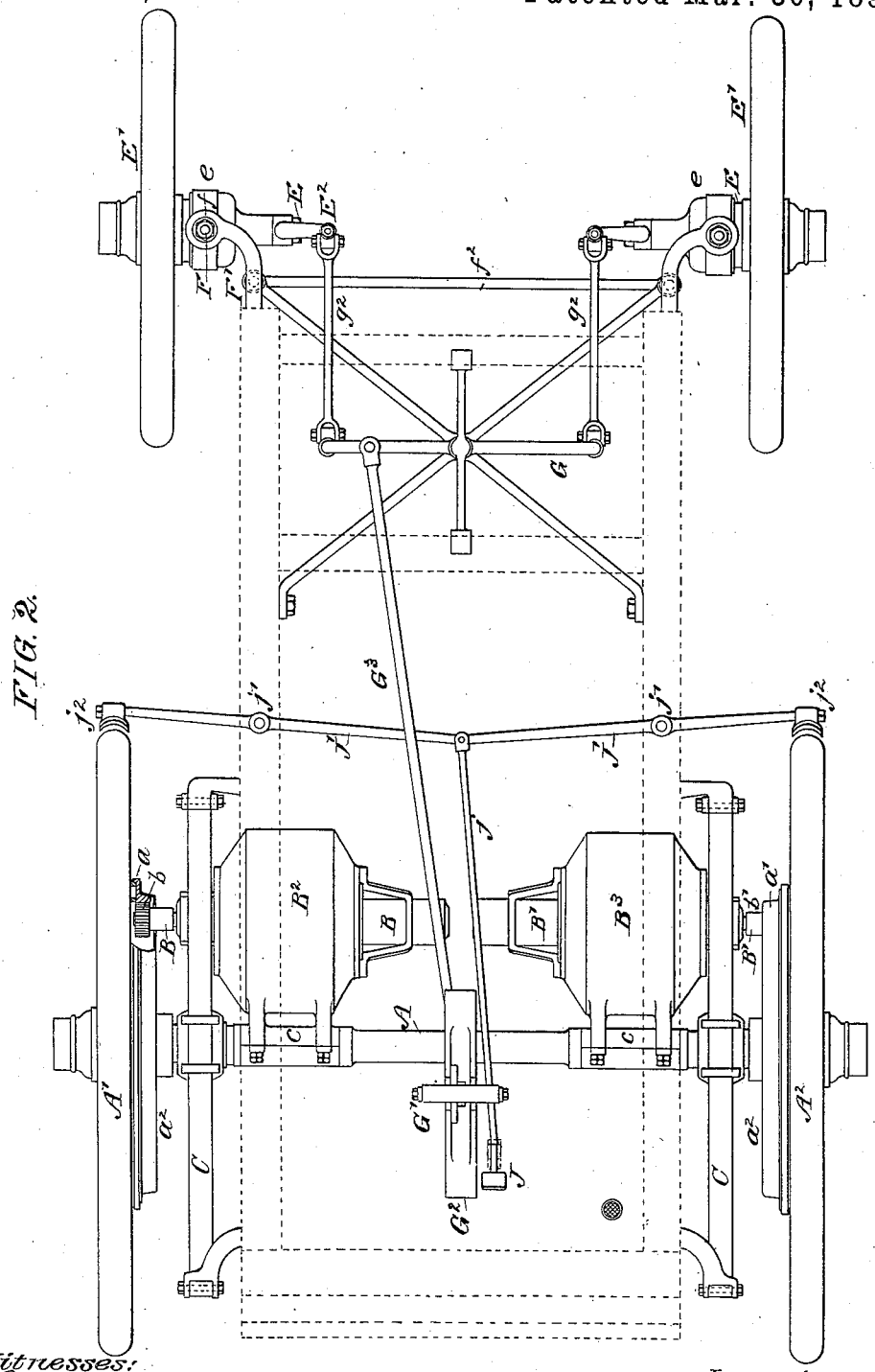
Figure 3:
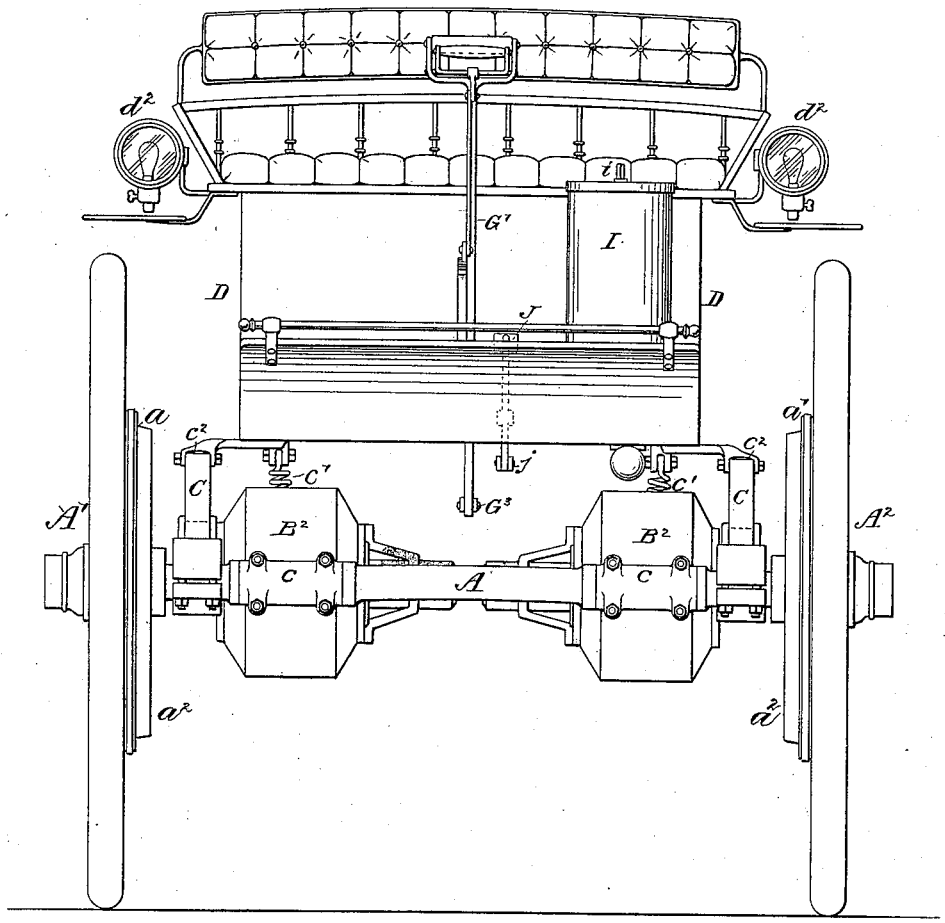
Figure 4:
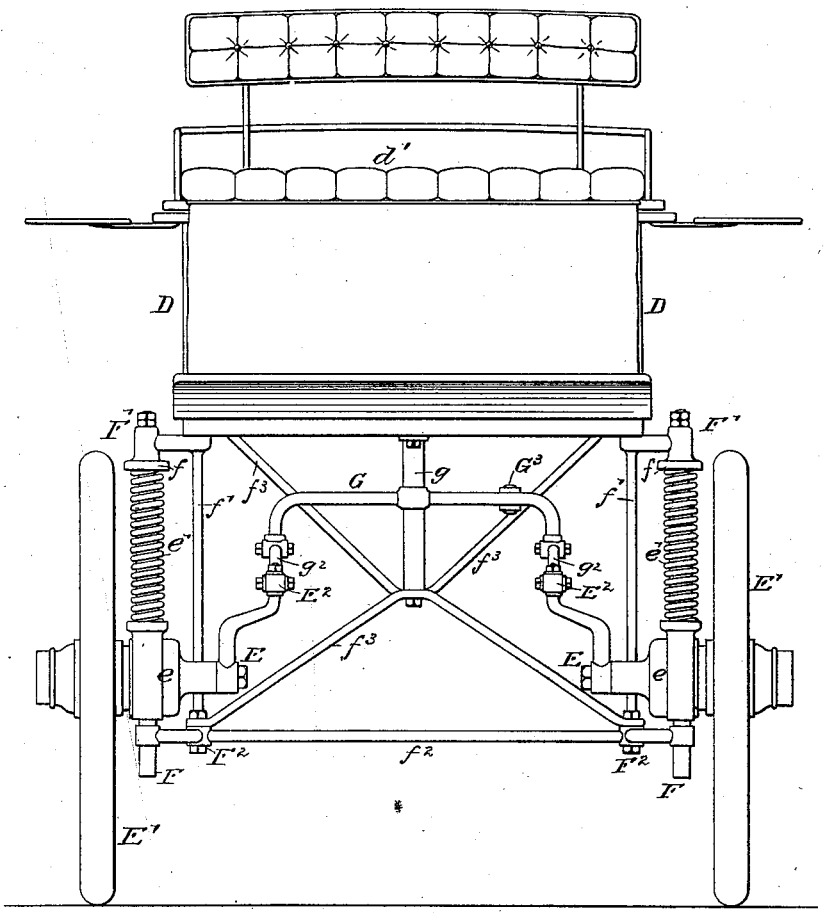

In the accompanying drawings, Figure 1 is a longitudinal sectional view of our improved vehicle in the form of a two-seated carriage. Fig. 2 is a plan view with the body of the carriage in dotted lines. Fig. 3 is a front view, and Fig. 4 is a rear view.

A is the front axle, on which are mounted the driving-wheels $A'$ $A^2$. Secured to these wheels in any suitable manner are gear-wheels $a\ a'$, having internal teeth which mesh with pinions $b\ b'$, secured to the shafts B B' of the motors $B^2$ $B^3$. These motors have brackets $c$, which are adapted to the axle A, as shown in Fig. 1. The outer ends of the motors are suspended from the body of the carriage by springs $c'$. By this arrangement the pinions are always kept in gear with the internal gear-wheels, but have a certain limited motion independent of the axle.

The forward portion of the body D is carried by the front axle A through the medium of the springs C, which are secured to the brackets $c^2$ $c^3$. The springs $c'$, alluded to above, are attached to the brackets $c^3$.

In the construction shown the forward wheels of the vehicle are the driving-wheels and the rear wheels are the steering-wheels, and by making two independent motors, each motor geared to a driving-wheel, the driving-wheels being independent of each other, it will be seen that when the vehicle is rounding a curve the differential movement of the wheels can take place.

Each of the rear wheels $E'$ is mounted on a short axle E, and passing through the box $e$ of each axle is a vertical rod F, secured to a bracket $F'$, projecting from the body D of the vehicle, and between the shouldered head $f$ of this bracket and the box $e$ is a coiled spring $e'$. Each of these springs $e'$ is of sufficient tension to support the rear of the body D.

The lower end of the rod F is held by a bracket $F^2$, carried by the vertical rods $f'$, extending from the upper bracket $F'$, the transverse bar $f^2$, and the frame $f^3$, which extends diagonally under the carriage-body and braces the brackets. Thus the rods F are held rigidly in a vertical position, so that the axles can be turned on them as vertical pivots.

Mounted on the shaft $g$, adapted to the frame $f^3$ and a bar $g'$, is a two-armed lever G. Brackets $E^2$ on the rear axles are connected to the lever G by rods $g^2$. Gimbal-joints couple the rods to the shafts and to the brackets, so that when the lever is turned by the steering mechanism the wheels will turn in unison to the proper angle.

$G'$ is the steering-lever, in the present instance in the form of a hand-lever, situated within easy reach of the operator. This lever is pivoted at $g^3$ to a bracket $G^2$ on the carriage-body D and is connected by a rod $G^3$ to one arm of the lever G, so that on moving the steering-lever $G'$ motion will be imparted to the two axles E E and their wheels will be turned in unison to the proper angle, that the vehicle can make the curve desired.

The carriage-body D in the present instance has two seats $d\ d'$ and has a compartment $D'$ under the seats for storage batteries $D^2$, which are coupled in any manner to the motors $B^2$ $B^3$, either in multiple or series.

We have not shown the wires connecting with the batteries, as they will only confuse the drawings. The wires from the motors, as well as the wires from the batteries, lead to the controller I, which has the usual hand-lever $i$ within the reach of the operator. We have also shown the side lights $d^2$ of the carriage provided with incandescent lamps connected to the batteries.

The brake mechanism is of the ordinary form, having the foot-lever J connected by a rod $j$ to the brake-levers J', pivoted at $j'$ to the carriage-body, and having shoes $j^2$, which can be moved into contact with the driving-wheels A' and A².

We may inclose the gear-wheels $a\ a'$ on the wheels A' A² with casings $a^2$, so as to prevent the accumulation of dirt in the teeth of the wheels.

It will be understood that any form of body may be used, depending upon the use for which the vehicle is intended, for instance, any form of carriage-body may be used, or, if the vehicle is to be used for trade purposes, a wagon-body may be substituted for the carriage and the space for the batteries can be arranged to conform to the style of body used.

The drawings show the wheels provided with rubber tires, as the vehicle is intended to be propelled on ordinary roadways without tracks, but our invention may be used on a carriage adapted to tracks, in which case suitable tires will be provided for the wheels. The wheels in some instances may be ordinary carriage-wheels with metallic tires, but we prefer, where possible, to use rubber-tired wheels.

We claim as our invention—

1. The combination in an electrically-propelled vehicle, of the body, a rigid axle, two driving-wheels loosely mounted on said axle, two electric motors mounted on the axle side by side so as to aline at all times with the axle, each motor having a short shaft, one shaft gearing with one driving-wheel and the other shaft gearing with the other driving-wheel so that the two driving-wheels are independently driven, substantially as described.

2. The combination in an electrically-propelled vehicle, of the body, the forward driving-wheels, a forward axle on which the driving-wheels are independently mounted, rear steering-wheels, steering mechanism therefor, two electric motors mounted side by side on the front axle so that they will at all times aline therewith, gearing between one electric motor and one forward driving-wheel and gearing between the other electric motor and the other forward driving-wheel so that the two driving-wheels will be independently driven, substantially as described.

3. The combination in an electrically-propelled vehicle, of the driving-wheels, the wheels E', short axles for each wheel, vertical rods passing through the axles, springs mounted on the rods and carried by the axles, with a carriage-body the rear of which is supported by the springs and steering mechanism connected to the short axles, substantially as described.

4. The combination in an electrically-propelled vehicle, of the body, driving mechanism therefor, wheels E', short axles for each wheel, vertical rods on which the axles turn, springs mounted between the axles and the body of the vehicle, brackets on each axle, a two-armed lever connected to the brackets and a steering-lever connected to the two-armed lever, substantially as described.

5. The combination in an electrically-propelled vehicle, of the driving-wheels, the axle, the vehicle-body, the rear wheels E', short axles for each wheel, brackets F', F², one above and the other below each axle, a rod extending from one bracket to the other and through the axle and on which the axle swings and a spring mounted between the axle and the upper bracket, with steering mechanism connected to the axle, substantially as described.

6. The combination in an electrically-propelled vehicle, of the carriage-body, the driving-wheels and their axle, the rear wheels, short axles for each rear wheel, brackets secured to the body, a vertical rod adapted to each bracket and passing through the axle, springs on each rod, stays, a vertical shaft $g$ supported by the stays, a two-armed lever mounted on the shaft, connecting-rods extending from the lever to the axle and a steering-lever G' connected to one arm of the lever G, substantially as described.

7. The combination in an electrically-propelled vehicle, the vehicle-body D having compartments for the storage of batteries, a front axle, driving-wheels thereon, two motors hung to the axle and also hung to the vehicle-body through the medium of springs, gear-wheels on each driving-wheel, a shaft for each motor, each shaft having a pinion meshing with the gear-wheel on the driving-wheel, rear steering-wheels, short axles on which the steering-wheels are mounted, brackets, and a vertical rod on which the axles are mounted, a steering-lever at the front of the vehicle connected to the axles at the rear through the medium of a two-armed lever so that the steering-wheels will turn in unison, the gearing of the front driving-wheels being such as to allow for the independent rotation of the wheels, substantially as described.

In testimony whereof we have signed our names to this specification in the presence of two subscribing witnesses.

HENRY G. MORRIS.
PEDRO G. SALOM.

Witnesses:
 WILL. A. BARR,
 JOS. H. KLEIN.